United States Patent
Tanaka

(10) Patent No.: US 12,543,932 B2
(45) Date of Patent: Feb. 10, 2026

(54) WIRE-DRIVEN MANIPULATOR

(71) Applicant: CANON KABUSHIKI KAISHA, Tokyo (JP)

(72) Inventor: Yusuke Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 16/488,146

(22) PCT Filed: Feb. 26, 2018

(86) PCT No.: PCT/JP2018/007030
§ 371 (c)(1),
(2) Date: Aug. 22, 2019

(87) PCT Pub. No.: WO2018/159555
PCT Pub. Date: Sep. 7, 2018

(65) Prior Publication Data
US 2019/0374090 A1    Dec. 12, 2019

(30) Foreign Application Priority Data

Feb. 28, 2017  (JP) ................. 2017-037715

(51) Int. Cl.
*A61B 1/005* (2006.01)
(52) U.S. Cl.
CPC .......... *A61B 1/0057* (2013.01); *A61B 1/0052* (2013.01)
(58) Field of Classification Search
CPC ... A61B 1/00066; A61B 1/005; A61B 1/0051; A61B 1/0052; A61B 1/0053;
(Continued)

(56) References Cited

U.S. PATENT DOCUMENTS

| | | | |
|---|---|---|---|
| 4,836,189 | A | 6/1989 | Allred, III et al. |
| 4,905,666 | A | 3/1990 | Fukuda |

(Continued)

FOREIGN PATENT DOCUMENTS

| | | |
|---|---|---|
| CN | 101124008 A | 2/2008 |
| CN | 102711629 A | 10/2012 |

(Continued)

OTHER PUBLICATIONS

H. Wang, S. Fan and H. Liu, "An experimental comparison of four different structures for continuum manipulators," 2016 IEEE International Conference on Mechatronics and Automation, 2016, pp. 459-464, doi: 10.1109/ICMA.2016.7558607, (Year: 2016).*

(Continued)

*Primary Examiner* — Michael J Carey
*Assistant Examiner* — Megan Elizabeth Monahan
(74) *Attorney, Agent, or Firm* — Canon U.S.A., Inc. IP Division

(57) ABSTRACT

A wire-driven manipulator includes a plurality of flexible members, a drive unit configured to drive the plurality of flexible members, and at least one bendable portion including a distal end member and at least one guide member disposed nearer to the drive unit than the distal end member. The bendable portion is configured to be bent by driving the plurality of flexible members. The plurality of flexible members are connected to the distal end member. At least one of the plurality of flexible members is also connected to the guide member. The other of the plurality of flexible members is configured to be slidable with respect to the guide member.

5 Claims, 7 Drawing Sheets

(58) Field of Classification Search

CPC ... A61B 1/0055; A61B 1/0056; A61B 1/0057;
A61B 1/0058; A61B 2017/003; A61B
2017/00305; A61B 2017/00309; A61B
2017/00314; A61B 2017/00318; A61B
2017/00323; A61B 2017/00327; A61M
25/0133; A61M 25/0136; A61M 25/0138;
A61M 25/0141; A61M 25/0144; A61M
25/0147; A61M 2025/015

See application file for complete search history.

(56) References Cited

U.S. PATENT DOCUMENTS

| | | | | |
|---|---|---|---|---|
| 5,448,989 | A * | 9/1995 | Heckele | A61B 1/0052 600/149 |
| 6,875,170 | B2 * | 4/2005 | Francois | F15B 15/103 600/152 |
| 9,333,650 | B2 * | 5/2016 | Bajo | B25J 9/163 |
| 10,278,683 | B2 * | 5/2019 | Robert | A61B 46/10 |
| 2003/0045778 | A1 * | 3/2003 | Ohline | A61B 1/0057 600/114 |
| 2005/0182298 | A1 | 8/2005 | Ikeda et al. | |
| 2010/0113875 | A1 * | 5/2010 | Yi | A61B 1/0057 600/110 |
| 2010/0324370 | A1 * | 12/2010 | Dohi | A61M 25/0043 600/144 |
| 2011/0245805 | A1 | 10/2011 | Swinehart et al. | |
| 2012/0296167 | A1 * | 11/2012 | Chen | A61B 1/0057 600/110 |
| 2013/0197539 | A1 * | 8/2013 | Simaan | A61B 34/37 606/130 |
| 2015/0122071 | A1 * | 5/2015 | Lee | B25J 18/06 74/490.04 |
| 2017/0000312 | A1 * | 1/2017 | Kakehashi | A61M 25/0138 |
| 2018/0264643 | A1 * | 9/2018 | Rabani | B25J 9/1615 |
| 2019/0054638 | A1 * | 2/2019 | Norton | B25J 9/06 |

FOREIGN PATENT DOCUMENTS

| | | |
|---|---|---|
| CN | 105120732 A | 12/2015 |
| CN | 106361386 A | 2/2017 |
| EP | 0612496 A1 | 8/1994 |
| EP | 3095375 A1 | 11/2016 |
| JP | H1033688 A | 2/1998 |
| JP | 2000210249 A | 8/2000 |

OTHER PUBLICATIONS

I.D. Walker, "Robot strings: Long, thin continuum robots," 2013 IEEE Aerospace Conference, Big Sky, MT, USA, 2013, pp. 1-12, doi: 10.1109/AERO.2013.6496902. keywords: {Robots;Space exploration; Tendons}. (Year: 2013).*

Ian D. Walker, "Continuous Backbone "Continuum" Robot Manipulators", International Scholarly Research Notices, vol. 2013, Article ID 726506, 19 pages, 2013. https://doi.org/10.5402/2013/726506 (Year: 2013).*

Xu, et al., "An Experimental Kinestatic Comparison between Continuum Manipulators with Structural Variations", 2014 EEE International Conference on Robotics & Automation (ICRA), Hong Kong Convention and Exhibition Center, Hong Kong, China, pp. 3258-3264, May 31-Jun. 7, 2014.

Notification of Transmittal of the International Search Report and the Written Opinion of the ISA, and the International Search Report and Written Opinion, for PCT/JP2018/007030, dated May 29, 2018.

* cited by examiner

WIRE-DRIVEN MANIPULATOR

TECHNICAL FIELD

The present disclosure relates to a wire-driven manipulator that can be used in an endoscope bendable section.

BACKGROUND ART

In the field of the endoscope apparatus, a flexible endoscope is known in which the curvature of the distal end to be inserted into an examinee can be operated. A continuum manipulator that is applicable also to the flexible endoscope is disclosed in NPL. 1. NPL. 1 discloses the structure of a continuum manipulator including a plurality of flexible members, a plurality of spacer members (spacer disks), a distal end member (an end disk), and a support member (a base disk). According to NPL. 1, three flexible members are connected only to the distal end member and slide with respect to the spacer members and the support member. By pushing and pulling the three flexible members, the continuum manipulator can be bent.

CITATION LIST

Non Patent Literature

NPL 1: K. Xu. M. Fu, and J. Zhao, "An Experimental Kinestatic Comparison between Continuum Manipulators with Structural Variations", in IEEE International Conference on Robotics and Automation (ICRA), Hong Kong, China, 2014, pp. 3258-3264.

SUMMARY OF INVENTION

Technical Problem

However, the flexible members are not fixed to the spacer members and frictionally slide with respect to the spacer members, so that the relative positions of the spacer members and the flexible members change. For that reason, driving the flexible members can cause the relative positions between the flexible members and the spacer members to be shifted, resulting in impairing the driving reproducibility of the bendable section. The low driving reproducibility causes an error in controlling the posture of the manipulator.

The present disclosure improves accuracy in controlling the posture of the bendable section.

Solution to Problem

A wire-driven manipulator according to an aspect of the present disclosure includes a plurality of flexible members, a drive unit configured to drive the plurality of flexible members, and at least one bendable portion including a distal end member and at least one guide member disposed nearer to the drive unit than the distal end member. The bendable portion is configured to be bent by driving the plurality of flexible members. The plurality of flexible members are connected to the distal end member. At least one of the plurality of flexible members is also connected to the guide member. The other of the plurality of flexible members is configured to be slidable with respect to the guide member.

Advantageous Effects of Invention

The present disclosure provides a wire-driven manipulator advantageous to improve the accuracy in controlling the posture of a bendable section.

Further features of the present disclosure will become apparent from the following description of exemplary embodiments with reference to the attached drawings.

DESCRIPTION OF EMBODIMENTS

Embodiments of the present disclosure will be described hereinbelow with reference to the drawings.

First Embodiment

Figure 1A:
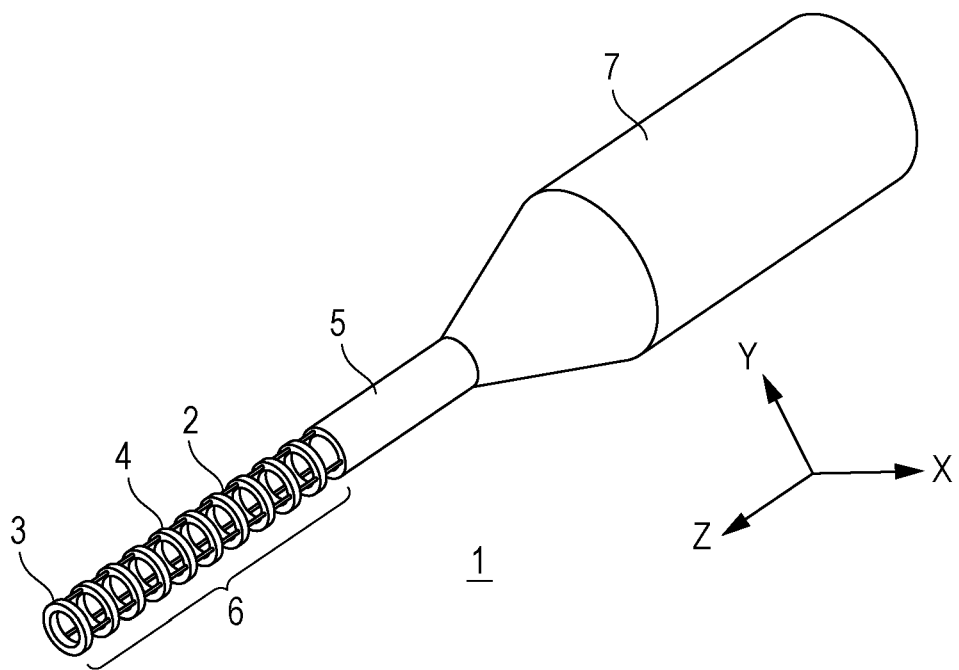
FIG. 1A is a perspective view of a wire-driven manipulator according to a first embodiment of the present disclosure illustrating the configuration thereof.
Figure 1B:
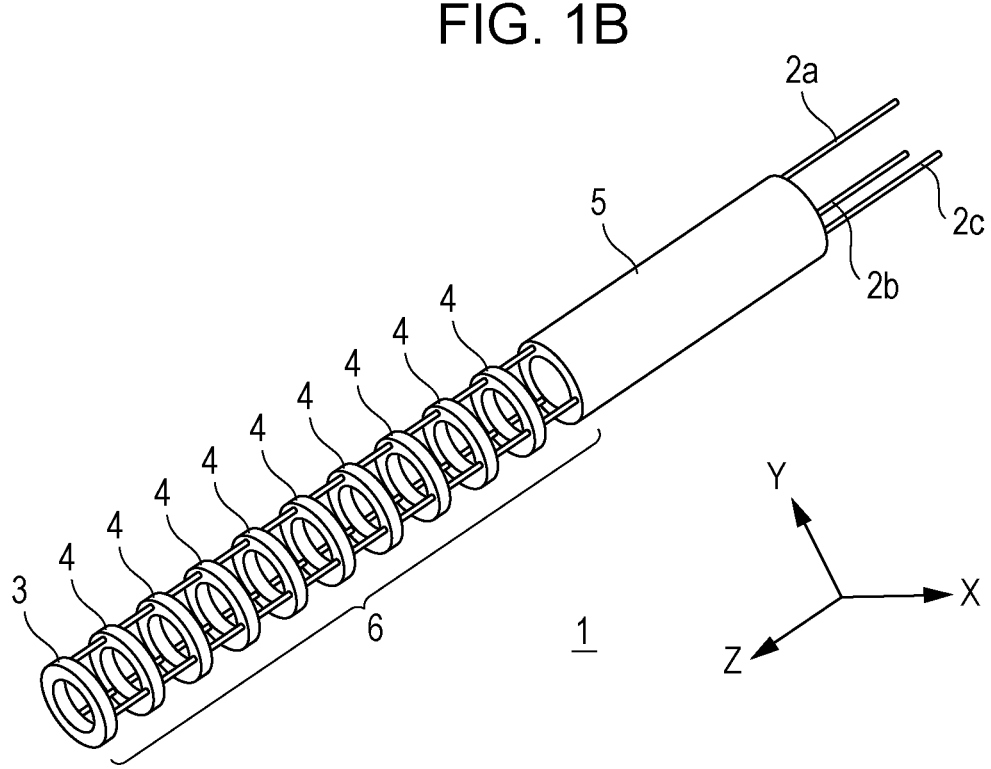
FIG. 1B is an enlarged view of the configuration of the wire-driven manipulator except a drive unit.

First, a wire-driven manipulator 1 according to a first embodiment of the present disclosure will be described. FIG. 1A is a perspective view of the wire-driven manipulator 1 according to the present embodiment illustrating the overall configuration thereof. FIG. 1B is an enlarged view of the configuration except a drive unit 7. The wire-driven manipulator 1 according to the present embodiment includes a bendable section 6 which is a bendable portion, a support member 5 that supports the bendable section 6, and the drive unit 7. The wire-driven manipulator 1 can be advanced to or retracted from, for example, a body cavity, by moving the wire-driven manipulator 1 along the Z-axis in FIGS. 1A and 1B. This movement may be performed manually by an operator, or the wire-driven manipulator 1 may be placed on a machine stage, and the operation may be controlled by a computer or the like.

The wire-driven manipulator 1 has a tubular structure as a whole, in which a tool, such as a fiber scope, can be passed through the hollow of the tube.

The bendable section 6 includes flexible members 2a, 2b, and 2c, a distal end member 3, and guide members 4.

The flexible members 2a, 2b, and 2c are flexible members extending along the Z-axis in the drawings. The flexible members 2a, 2b, and 2c are connected to the distal end member 3 at the distal end in the positive direction of the Z-axis and are connected to the drive unit 7 at the proximal end in the negative direction of the Z-axis. The flexible members 2a, 2b, and 2c may be metal wires, such as piano wires, stainless-steel wires, or nickel-titanium alloy wires.

Figure 2:
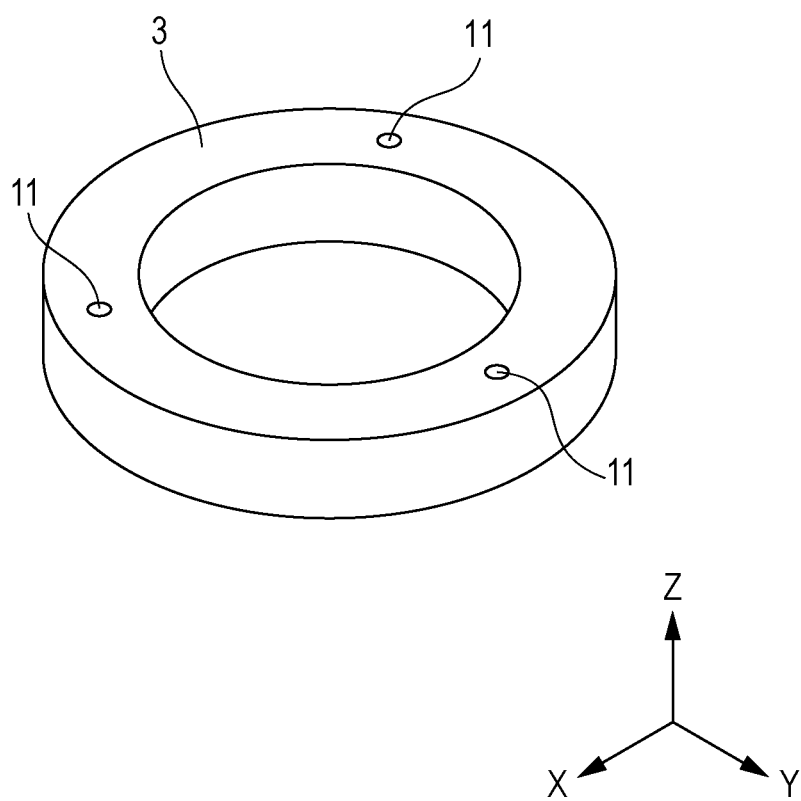
FIG. 2 is a perspective view of a distal end member according to the first embodiment.

FIG. 2 illustrates the configuration of the distal end member 3. The distal end member 3 has a ring shape (a circular shape in this case) with the Z-axis in FIG. 2 as the center axis and has fixing holes 11 to which the flexible members 2a, 2b, and 2c are connected. The flexible members 2a, 2b, and 2c are connected to the fixing holes 11 by adhesion, pinning, screwing, or the like. The fixing holes 11 are disposed at intervals of 120° around the center of the circular ring in consideration of symmetry. Even if the number of flexible members for controlling the bending motion of the bendable section 6 is other than three, the fixing holes 11 may be similarly disposed at regular angular intervals.

Figure 3A:
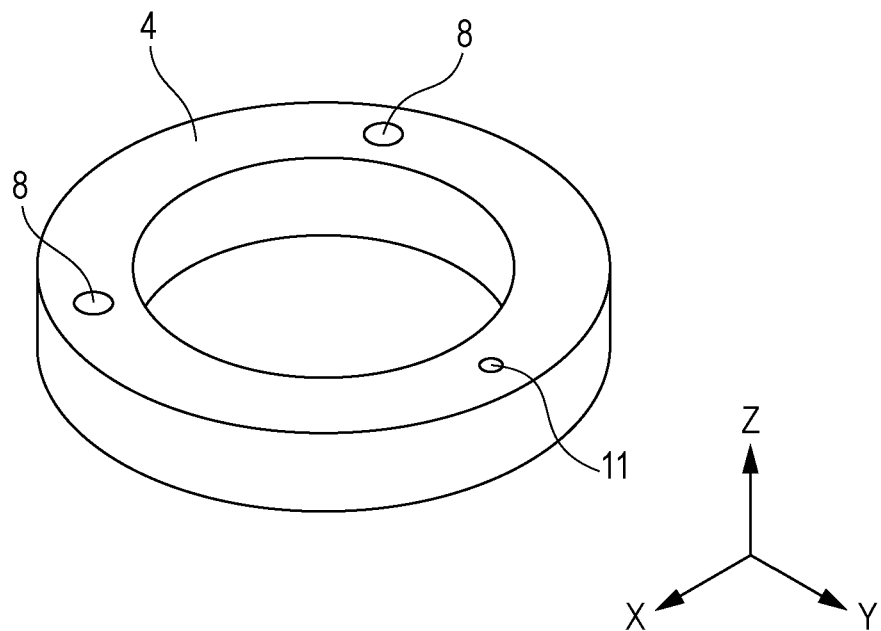
FIG. 3A is a perspective view of a guide member according to the first embodiment.
Figure 3B:
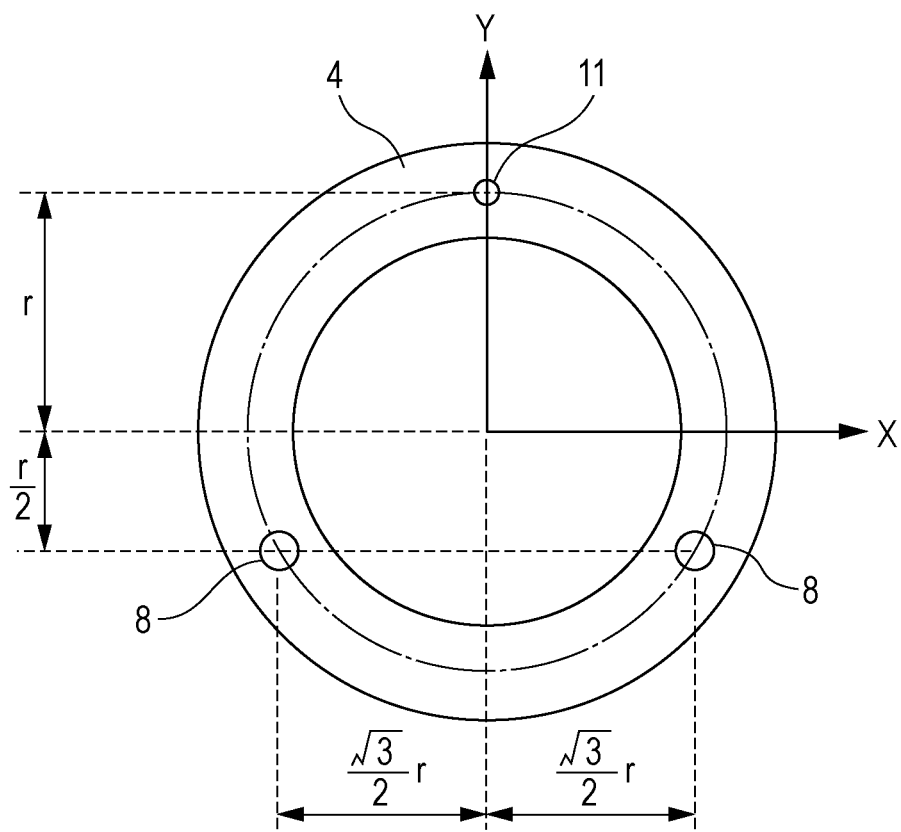
FIG. 3B is a plan view of the guide member.

FIG. 3A is a perspective view of each guide member 4, and FIG. 3B is an X-Y plan view of the guide member 4. The guide member 4 has a ring shape, with Z-axis in the drawing as the center axis, like the distal end member 3. The guide member 4 has two guide holes 8 and one fixing hole 11 passing therethrough in the Z-axis direction. Some of the flexible members 2a, 2b, and 2c are passed through the two guide holes 8. One of the flexible members 2a, 2b, and 2c, which is not passed through the guide holes 8, is fixed to the fixing hole 11. Here, a configuration in which the flexible member 2a is fixed to the fixing hole 11, and the flexible members 2b and 2c are passed through the guide holes 8 will be described. The guide holes 8 each have an opening through which the flexible member 2b or 2c can slide, while the flexible member 2a passed through the fixing hole 11 is fixed to the fixing hole 11, so that the guide members 4 move together with the motion of the flexible member 2a. The fixing hole 11 may have an opening narrower than the guide holes 8 so that the flexible member 2a is fixed thereto, or the flexible member 2a may be fixed by adhesion, pinning, screwing, or another means. The guide members 4 may be made of a member having a small coefficient of friction, such as resin, because the guide holes 8 contact the flexible members 2b and 2c. As illustrated in FIG. 3B, the two guide holes 8 and the fixing hole 11 of each guide member 4 are disposed at the vertices of an equilateral triangle inscribed in a circle having a radius r from the center of the guide member 4, and the fixing hole 11 is positioned on the Y-axis. In other words, the three flexible members 2a, 2b, and 2c are at equidistant positions from each other.

The support member 5 has a tubular shape with the Z-axis in FIGS. 1A and 1B as the center axis and has a hole passing therethrough in the direction of the Z-axis to allow the flexible members 2a, 2b, and 2c to pass therethrough like the guide members 4. The flexible members 2a, 2b, and 2c are slidable through the through-hole in the support member 5. The support member 5 has the function of preventing the flexible members 2a, 2b, and 2c passing through the support member 5 from buckling when the flexible members 2a, 2b, and 2c are driven in the direction of the Z-axis, so that a force is efficiently transmitted to the bendable section 6.

The bendable section 6 is a section from the distal end member 3 to the distal end of the support member 5 in the positive direction of the Z-axis and is bent when the flexible members 2a, 2b, and 2c are driven. As described above, the bendable section 6 includes the distal end member 3 provided at the distal end and the guide members 4 provided nearer to the drive unit than the distal end member 3. The bendable section 6 is configured to be bent by driving the flexible members 2a, 2b, and 2c, which are a plurality of flexible members. The flexible members 2a to 2c are connected to the distal end member 3, of which the flexible member 2a is connected also to the guide members 4, and the flexible members 2b and 2c are slidable with respect to the guide holes 8 of the guide members 4. This configuration allows the distance between the guide members 4 to be kept constant also when the bendable section 6 is bent, providing accurate control of the posture of the bendable section 6.

The drive unit 7 has a mechanism capable of pushing and pulling the flexible members 2a, 2b, and 2c independently in the direction of the Z-axis in FIGS. 1A and 1B. The flexible members 2a, 2b, and 2c are each connected to the drive unit 7 at the proximal end in the negative direction of the Z-axis so as to be pushed and pulled in the direction of the Z-axis. The drive unit 7 includes, for example, actuators, and supplies a driving force to the flexible members 2a, 2b, and 2c by the operation of the flexible member actuators. The operation of each actuator is controlled by a computer or the like.

Figure 4:
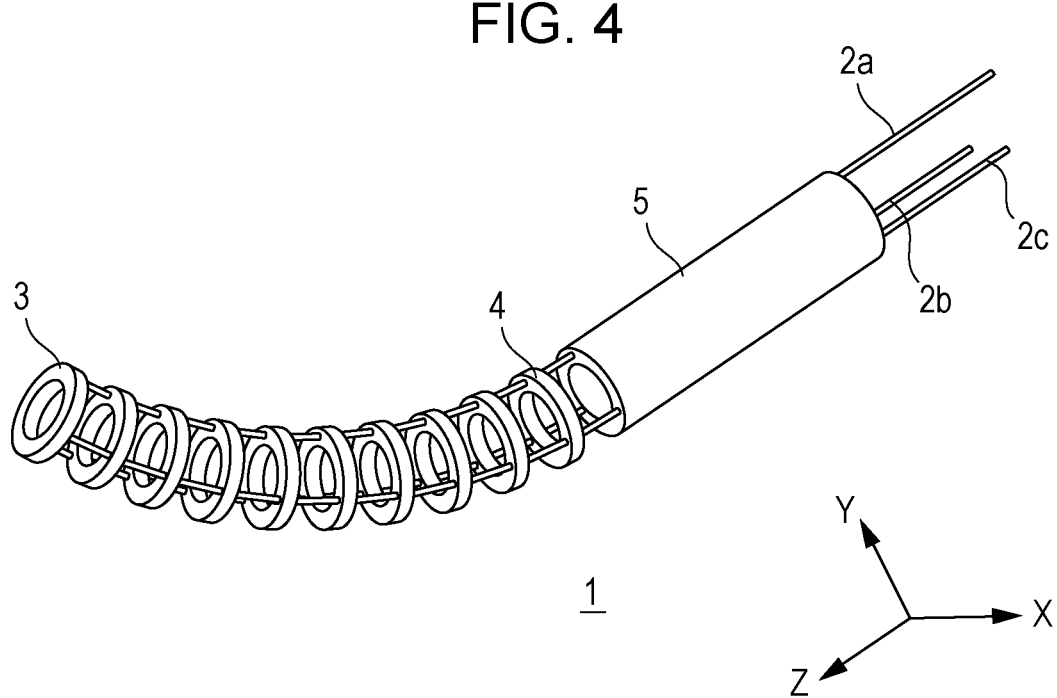
FIG. 4 is a perspective view of the wire-driven manipulator according to the first embodiment illustrating the bent state thereof.

Next, the bending motion of the wire-driven manipulator 1 when the flexible members 2a, 2b, and 2c are driven will be described. In one example of the bending motion of the wire-driven manipulator 1, FIG. 4 is a perspective view of the wire-driven manipulator 1 illustrating the bent state of the bendable section 6 in FIGS. 1A and 1B when the flexible member 2a is not displaced, and the flexible members 2b and 2c are driven by a displacement of d in the positive direction of the z-axis, and FIG. 5 is an Y-Z plan view thereof.

Figure 5:
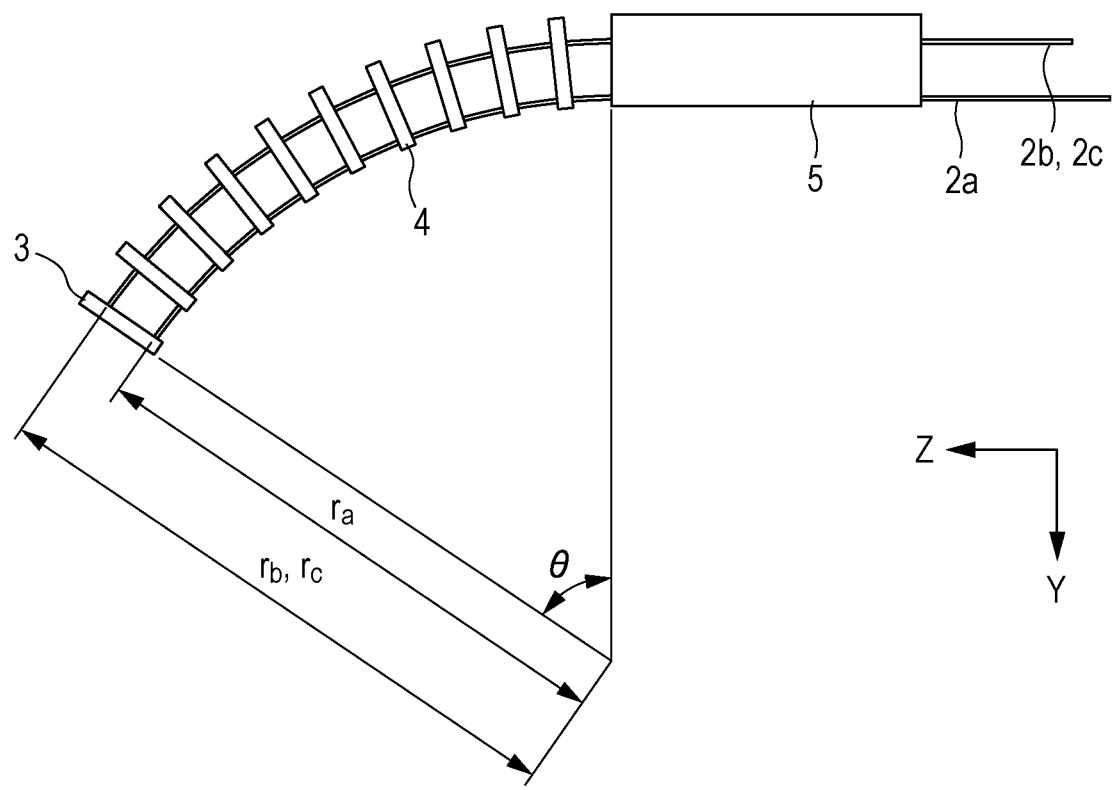
FIG. 5 is a plan view of the wire-driven manipulator according to the first embodiment illustrating the bent state thereof.

Referring to FIG. 5, when the bendable section 6 is bent in the Y-Z plane while keeping the curvature constant, the following relational expression are obtained.

$$ra \times \theta = L \qquad \text{(Eq. 1)}$$

$$rb \times \theta = L + d \qquad \text{(Eq. 2)}$$

$$rc \times \theta = L + d \qquad \text{(Eq. 3)}$$

where ra, rb, and rc are respectively the radii of curvature of the flexible members 2a, 2b, and 2c, θ is the angular change of the distal end member 3 after being driven, and L is the length of the bendable section 6 before being driven.

Referring to FIG. 3B, the distances between the fixing hole 11 and the guide holes 8 projected to the Y-Z plane are each 3r/2, $$ra = rb - 3r/2 = rc - 3r/2 \qquad \text{(Eq. 4)}$$

Therefore, the following relation is obtained from Eqs. 1, 2, 3, and 4.

$$\theta = 2d/3r \qquad \text{(Eq. 5)}$$

In the above example, the bendable section 6 is bent in the Y-Z plane by driving the flexible members 2b and 2c in the positive direction of the Z-axis, with the flexible member 2a fixed. Similarly, when the flexible members 2b and 2c are respectively driven by a displacement of d in the positive direction of the z-axis and in the negative direction of the Z-axis, with the flexible member 2a fixed, the bendable section 6 can be bent in the X-Z plane. Similar to the deformation in the Y-Z plane, the following relational expressions are obtained.

$$ra \times \theta = L \qquad \text{(Eq. 6)}$$

$$rb \times \theta = L + d \qquad \text{(Eq. 7)}$$

$$rc \times \theta = L - d \qquad \text{(Eq. 8)}$$

$$ra = rb - \sqrt{3}r/2 = rc + \sqrt{3}r/2 \qquad \text{(Eq. 9)}$$

where ra, rb, and rc are respectively the radii of curvature of the flexible members $2a$, $2b$, and $2c$, $\theta$ is the angular change of the distal end member 3 after being driven, and L is the length of the bendable section 6 before being driven. Therefore, the following relation is obtained from Eqs. 6, 7, 8, and 9.

$$\theta = 2d/\sqrt{3}r \quad \text{(Eq. 10)}$$

Furthermore, the bendable section 6 can be bent in any plane including the Z-axis, depending on the combination of the driving amounts of the flexible members $2b$ and $2c$. It is sufficient to drive only two of the three flexible members 2 to control the posture of the distal end member 3. As a result, the size of the drive unit 7 can be reduced because one flexible member 2 is not driven and two flexible members 2 are driven. In the case of such a configuration, the flexible member 2 that is not driven may not be connected to an actuator but may be fixed to a fixing member. Examples of the fixing member include the casing of the drive unit 7 or a support member separate from the drive unit 7. A fixing method therefor may be any method, such as adhesion or hooking the flexible member 2 on a protrusion, such as a hook. The flexible member 2 that is not driven may be connected in the guide holes 8 of the guide members 4. In the case where a direction in which the wire-driven manipulator 1 is to be bent is determined in advance, two of the three flexible members 2 may not be driven but only one may be driven. Alternately, a mechanism for rotating the wire-driven manipulator 1 around the Z-axis my be separately provided, with which the bendable section 6 may be bent in any direction by operating only one flexible member 2. In this case, two of the three flexible members 2 may be fixed to the guide members 4. For example, the flexible members 2 that are not driven by the drive unit 7 are fixed to the guide members 4, and the flexible member 2 driven by the drive unit 7 is slid by not being fixed to the guide members 4. In other words, part of the plurality of flexible members 2 are connected to the distal end member 3 and the guide members 4, and the other flexible member 2 is connected to the distal end member 3 and made slidable with respect to the guide members 4.

The guide members 4 have the function of restraining the flexible members 2 to prevent the flexible members 2 from buckling when the bendable section 6 is bent so as to keep the curvature of the bendable section 6 constant by keeping the interval therebetween. Therefore, increasing the number of guide members 4 in the bendable section 6 makes it easy to prevent buckling. However, when the flexible members 2 are driven in the negative direction of the Z-axis, the length of the flexible member 2 in the bendable section 6 is reduced, so that the interval between adjacent guide members 4 is decreased. For that reason, excessively increasing the number of guide members 4 can make adjacent guide members 4 mechanically interfere with each other. To prevent the flexible members 2 from buckling, to make the curvature of the bendable section 6 constant, and to prevent the interference between the guide members 4, the wire-driven manipulator 1 may be configured to satisfy the relation expressed by Eq. 11.

$$L - D < Tt + Tg \times Ng \quad \text{(Eq. 11)}$$

where L is the length of the bendable section 6 before being driven, D is the maximum amount of driving of the flexible member 2, Tt is the thickness of the distal end member 3 in the direction of the Z-axis, Tg is the thickness of the guide member 4 in the direction of the Z-axis, and Ng is the number of guide members 4 in the bendable section 6.

By fixing the guide members 4 to one of the plurality of flexible members 2, the interval between the guide members 4 can be kept constant when the bendable section 6 is bent, so that the driving reproducibility of the bendable section 6 can be enhanced. This allows the curvature in the bendable section 6 to be kept constant, thereby improving the control performance on the bendable section 6 when the flexible members 2 are driven. Furthermore, keeping the interval between adjacent guide members 4 prevents the mechanical interference between the guide members 4.

Second Embodiment

A wire-driven manipulator according to a second embodiment of the present disclosure will be described with reference to FIG. 6. In the first embodiment, the wire-driven manipulator 1 includes only one bendable section 6. In the present embodiment, the wire-driven manipulator 1 includes a plurality of bendable sections $6a$ and $6b$. In the present embodiment, the bending motions of the bendable sections $6a$ and $6b$ are controlled by three flexible members as in the first embodiment.

Figure 6:
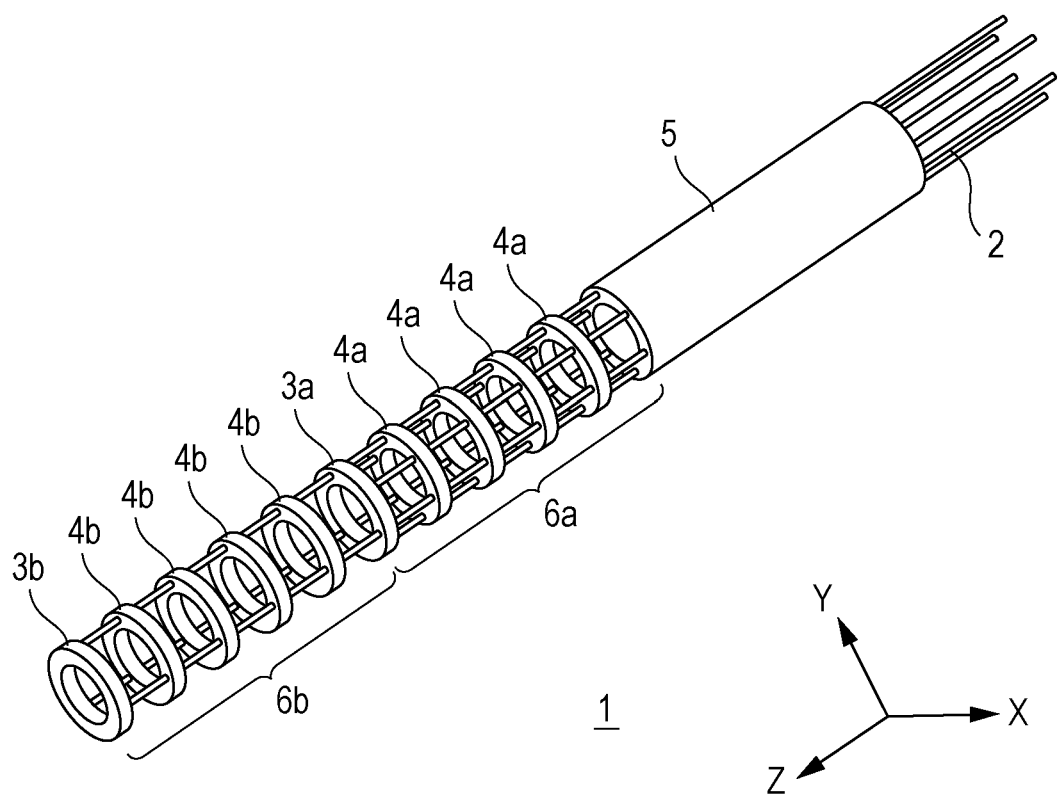
FIG. 6 is a perspective view of a wire-driven manipulator according to a second embodiment of the present disclosure illustrating the configuration thereof.

The wire-driven manipulator 1 illustrated in FIG. 6 includes distal end members $3a$ and $3b$ at the respective distal ends of the bendable sections $6a$ and $6b$. Three flexible members 2 are connected to each of the distal end members $3a$ and $3b$. Guide members $4b$ each have three guide holes 8 through which the flexible members 2 connected to the distal end member $3b$ are passed. One of the three flexible members 2 is connected to one of the guide holes 8, the other two are slidable in the other guide holes 8.

Figure 7:
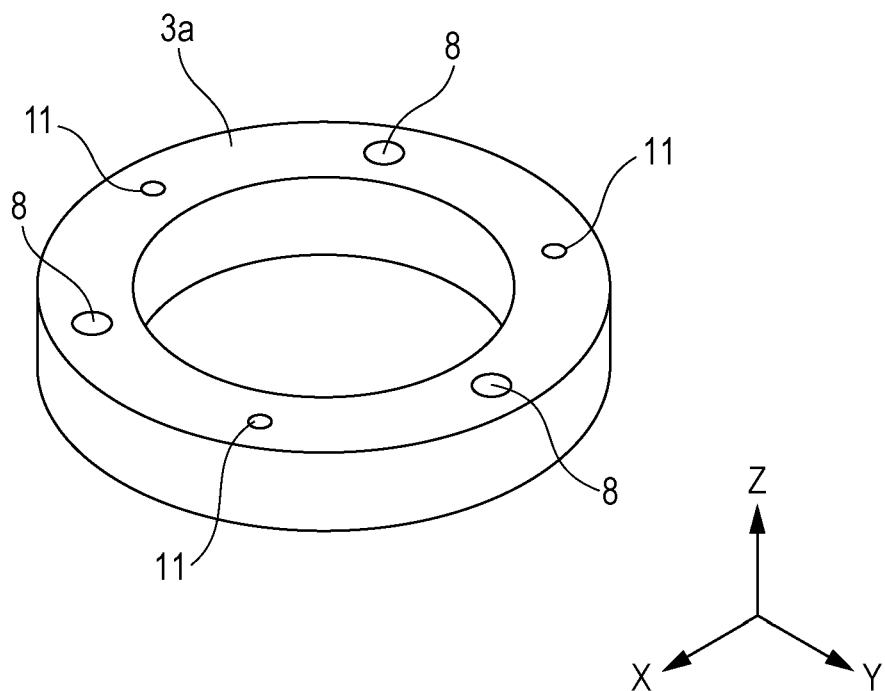
FIG. 7 is a perspective view of a distal end member according to the second embodiment.

FIG. 7 is a perspective view f the distal end member $3a$. The distal end member $3a$ has three guide holes 8 and three fixing holes 11. Flexible members 2 for controlling the bending motion of the bendable section $6b$ are slidably passed through the guide holes 8, and flexible members 2 for controlling the bending motion of the bendable section $6a$ are fixed to the fixing holes 11. In the present embodiment, the flexible members 2 connected to the fixing holes 11 are connected at the distal ends to the fixing holes 11.

Figure 8:
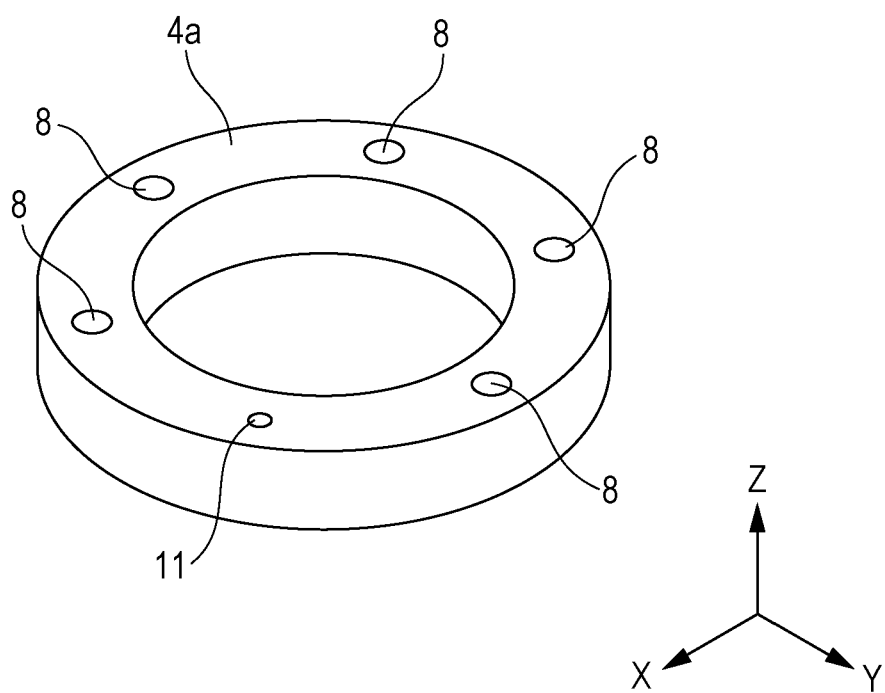
FIG. 8 is a perspective view of a guide member according to the second embodiment.

FIG. 8 is a perspective view of each of guide members $4a$ constituting the bendable section $6a$. The guide member $4a$ has five guide holes 8 and one fixing hole 11. Also in this case, one of the three flexible members 2 that control the bending motion of the bendable section $6a$ is fixed to the fixing hole 11 of each guide member $4a$. The other flexible members 2 are slidably passed through the guide holes 8.

The support member 5 has a through-hole so that all the flexible members 2 can slide therethrough, as in the first embodiment. The flexible members 2 are connected to a drive unit 7 (not shown) at the proximal ends opposite to the distal end members $3a$ and $3b$ and can be independently driven. Driving at least two of the three flexible members 2 each connected to the distal end members $3a$ and $3b$ allows the bendable sections $6a$ and $6b$ to be bent in any plane including the Z-axis. The other one flexible member 2 may be fixed to the interior of the drive unit 7 so as not to be driven.

Next, driving of the wire-driven manipulator 1 including the plurality of bendable sections $6a$ and $6b$ will be described.

When the flexible members 2 connected to the distal end member $3a$ are not driven but the flexible members 2 connected to the distal end member $3b$ are driven, the posture of the distal end member $3a$ does not change, and only the shape of the bendable section 6b changes because the shape of the bendable section 6a is restrained by the flexible members 2 connected to the distal end member 3a. The posture of the distal end member 3b depends on the amount of driving of the flexible members 2 connected to the distal end member 3b. The change in posture at that time is similar to that in the first embodiment, and a description thereof will be omitted.

If only the flexible members 2 connected to the distal end member 3a are driven, the flexible members 2 connected to the distal end member 3b slide in the bendable section 6a. This does not influence the posture of the distal end member 3a, so that the posture of the distal end member 3a can be controlled as in the first embodiment. The posture of the distal end member 3b does not change because it is restrained by the flexible member 2 connected to the distal end member 3b.

The above is a description of the case of driving a flexible member 2 connected to either of the distal end members 3a and 3b. When all the flexible members 2 are to be driven, the postures of the distal end members 3a and 3b may be independently determined depending on the driving amounts of the flexible members 2 connected to the distal end members 3a and 3b.

Also the present embodiment prevents the mechanical interference between the guide members 4b and the distal end member 3a by fixing the guide members 4b to the flexible member 2 connected to the distal end member 3b, thereby reducing the reactive force between the bendable section 6a and the bendable section 6b. This improves the driving accuracy in independently driving the bendable sections 6a and 6b.

Although a configuration including two bendable sections 6a and 6b has been described here, the number of bendable sections may be three or more.

Third Embodiment

Figure 9:
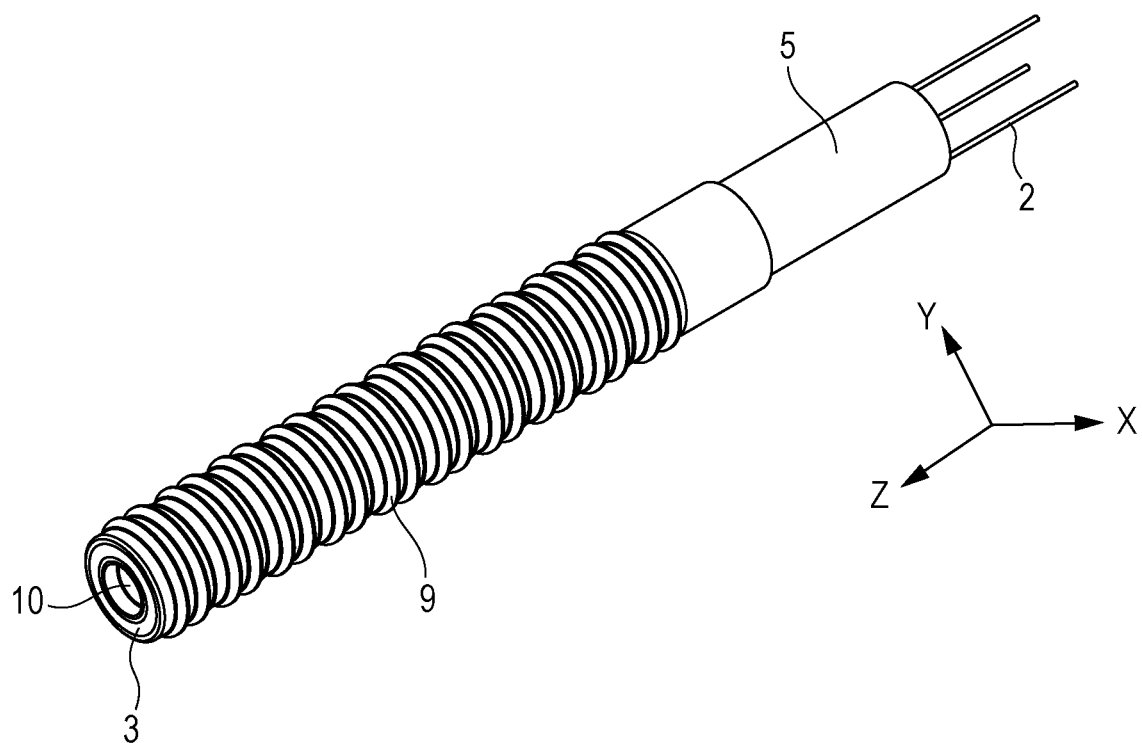
FIG. 9 is a perspective view of a wire-driven manipulator according to a third embodiment of the present disclosure illustrating the configuration thereof.
Figure 10:
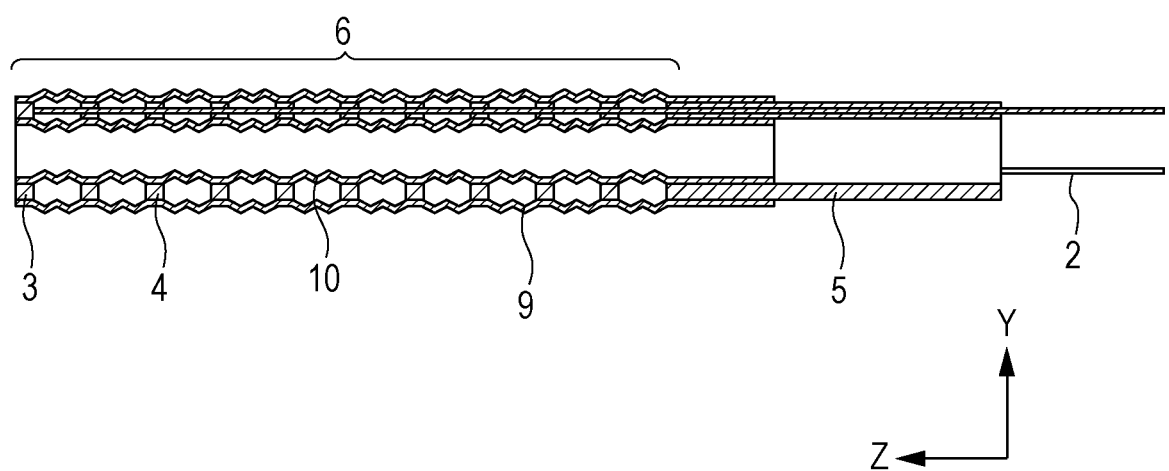
FIG. 10 is a sectional view of the wire-driven manipulator according to the third embodiment illustrating the configuration thereof.

A wire-driven manipulator according to a third embodiment of the present disclosure will be described with reference to FIGS. 9 and 10. As illustrated in FIG. 9, the wire-driven manipulator according to the present embodiment includes an outer cover 9 and an inner cover 10. FIG. 10 is a Y-Z cross-sectional view of the wire-driven manipulator illustrated in FIG. 9.

The outer cover 9 and the inner cover 10 are configured to respectively cover the outside and inside of the flexible members 2, the distal end member 3, the guide members 4, and the support member 5. The outer cover 9 and the inner cover 10 have the function of protecting the wire-driven manipulator and reducing the friction thereof. For example, when the wire-driven manipulator is to be intruded into the cavity of a living organism, the presence of the outer cover 9 and the inner cover 10 prevents the components, such as the distal end member 3 and the guide members 4, from directly contacting the living organism.

The outer cover 9 and the inner cover 10 may have a flexible structure, such as a bellows-like resin structure, or may be made of a low-elasticity material, such as rubber. The outer cover 9 and the inner cover 10 are each fixed to at least part of the distal end member 3, the guide members 4, and the support member 5. The outer cover 9 and the inner cover 10 may be formed integrally with the distal end member 3, the guide member 4, and the support member 5, and further, the outer cover 9 and the inner cover 10 may be integrally formed. In this case, the integration can reduce the thickness of the bendable section 6. Also the distal end of the distal end member 3 can be covered, so that the whole of the bendable section 6 can be protected from contamination. The outer cover 9 and the inner cover 10, which are cover members, may be detachable from the wire-driven manipulator 1.

The outer cover 9 and the inner cover 10 may have sufficiently lower bending rigidity than the bending rigidity of the structure including the flexible member 2, the distal end member 3, and the guide members 4 so as not to hinder the bending motion of the bendable section 6.

Since the guide members 4 are fixed to any of the plurality of flexible members 2, the relative position in the bendable section 6 is not changed due to the influence of an external force or friction from the outer cover 9 and the inner cover 10, so that the curvature in the bendable section 6 can be kept constant, and the driving reproducibility can be improved.

Having described embodiments of the present disclosure using specific examples, it is to be understood that the present disclosure is not limited to the embodiments and that various changes and a combination of a plurality of embodiments may be made without departing from the technical spirit of the present disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

REFERENCE SIGNS LIST

1 Wire-driven manipulator
2 Flexible member
3 Distal end member
4 Guide member
5 Support member
6 Bendable section
7 Drive unit 8 Guide hole
9 Outer cover
10 Inner cover While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-037715, filed Feb. 28, 2017, which is hereby incorporated by reference herein in its entirety.

The invention claimed is:

1. A wire-driven manipulator comprising:
a support member;
a first bendable portion including a first distal end member, a plurality of first guide members which are arranged separately from each other, and a plurality of first flexible wires each having one end connected to the first distal end member;
a second bendable portion including a second distal end member, a plurality of second guide members which are arranged separately from each other, and a plurality of second flexible wires each having one end connected to the second distal end member, the second bendable portion being disposed between the support member and the first bendable portion; and
a drive unit including a first actuator and a second actuator configured to drive at least one of the plurality of first flexible wires and at least one of the plurality of second flexible wires,
wherein at least one of the first flexible wires driven by the first actuator is slidable with respect to the plurality of first guide members, and the first bendable portion is configured to be bent by driving of the first actuator,
wherein at least one of the first flexible wires not driven by the drive unit is fixed to each of the plurality of first guide members,
wherein at least one of the second flexible wires driven by the second actuator is slidable with respect to the plurality of second guide members, and the second bendable portion is configured to be bent by driving of the second actuator,
wherein at least one of the second flexible wires not driven by the drive unit is fixed to each of the plurality of second guide members,
wherein the at least one of the first flexible wires driven by the first actuator also extends through and is slidable with respect to the second distal end member and the plurality of second guide members, and
wherein the plurality of second flexible wires do not pass through the plurality of first guide members.

2. The wire-driven manipulator according to claim 1, wherein the at least one of the first and the second flexible wires is fixed to a fixing member.

3. The wire-driven manipulator according to claim 1, wherein the plurality of first flexible wires and the plurality of second flexible wires each comprise three flexible wires disposed at regular intervals.

4. The wire-driven manipulator according to claim 1, further comprising a cover member covering the first bendable portion and the second bendable portion.

5. A manipulator system comprising:
the wire-driven manipulator according to claim 1; and
a machine-stage configured to move the wire-driven manipulator.

* * * * *